United States Patent
Hasegawa et al.

(10) Patent No.: US 7,555,762 B2
(45) Date of Patent: Jun. 30, 2009

(54) CLAMP MECHANISM FOR DISK-SHAPED RECORDING MEDIUM AND REPRODUCING APPARATUS FOR THE RECORDING MEDIUM

(75) Inventors: Hisashi Hasegawa, Kobe (JP); Fumihiko Fujimoto, Kobe (JP); Tsutomu Goto, Kobe (JP); Tomohisa Koseki, Kobe (JP); Hideo Asami, Kobe (JP); Koichi Ogawa, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 332 days.

(21) Appl. No.: 11/072,197

(22) Filed: Mar. 4, 2005

(65) Prior Publication Data
US 2005/0213484 A1 Sep. 29, 2005

(30) Foreign Application Priority Data
Mar. 4, 2004 (JP) .............................. 2004-060893
Jan. 24, 2005 (JP) .............................. 2005-015174

(51) Int. Cl.
G11B 17/03 (2006.01)
G11B 19/20 (2006.01)
(52) U.S. Cl. ...................................... 720/712; 720/713
(58) Field of Classification Search ................. 720/604, 720/605, 703, 706, 710, 712, 713, 709; 360/99.01–99.05
See application file for complete search history.

(56) References Cited

U.S. PATENT DOCUMENTS

| | | | | |
|---|---|---|---|---|
| 3,891,796 A | * | 6/1975 | Takahara et al. | 369/261 |
| 3,898,814 A | * | 8/1975 | Chou et al. | 464/87 |
| 4,068,851 A | * | 1/1978 | Yamamura | 369/79 |
| 4,498,165 A | * | 2/1985 | Wilkinson, Jr. | 720/710 |
| 4,747,002 A | * | 5/1988 | Takikawa et al. | 360/99.05 |
| 5,862,120 A | * | 1/1999 | Mukawa | 720/707 |
| 5,933,408 A | * | 8/1999 | Park et al. | 720/706 |
| 6,160,780 A | * | 12/2000 | Furukawa et al. | 720/604 |
| 6,552,993 B2 | * | 4/2003 | Huang | 720/712 |
| 6,845,511 B2 | * | 1/2005 | Kuo et al. | 720/706 |
| 2002/0044521 A1 | * | 4/2002 | Sogawa et al. | 369/270 |
| 2003/0133399 A1 | * | 7/2003 | Chuang et al. | 369/270 |

FOREIGN PATENT DOCUMENTS

| | | |
|---|---|---|
| JP | 61111055 | 5/1986 |
| JP | 5-298798 | 11/1993 |
| JP | 8339623 | 12/1996 |
| JP | 11-31350 | 2/1999 |
| JP | 11-213496 | 8/1999 |
| JP | 11238278 | 8/1999 |
| JP | 2000156007 | 6/2000 |

* cited by examiner

*Primary Examiner*—Brian E Miller
*Assistant Examiner*—Adam B Dravininkas
(74) *Attorney, Agent, or Firm*—Fogg & Powers LLC

(57) ABSTRACT

The invention aims to reduce the size of a disk clamp mechanism to be built into a disk player. The clamp mechanism comprises: a disk clamp portion formed integrally with a turntable; a clamper; and a clamper holder for holding the clamper via a clamper mounting shaft adapted to hold the clamper in rotatable fashion, wherein a flange portion provided at an end of the clamper mounting shaft is placed within a space formed inside the clamper. The clamper comprises a peripheral portion and a chamber portion in which the space is formed, and the disk clamp portion has a recessed groove portion engageable with the chamber portion, the structure being such that, when the disk is clamped, the end portion of the chamber portion is accommodated into the disk clamp portion, thus achieving a size reduction by reducing the height in a direction perpendicular to the disk.

4 Claims, 15 Drawing Sheets

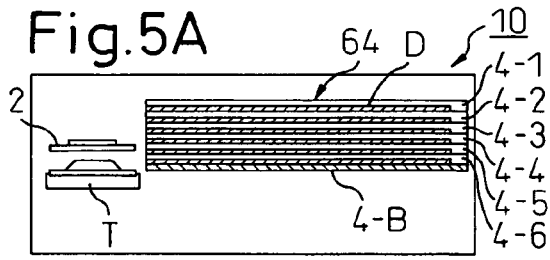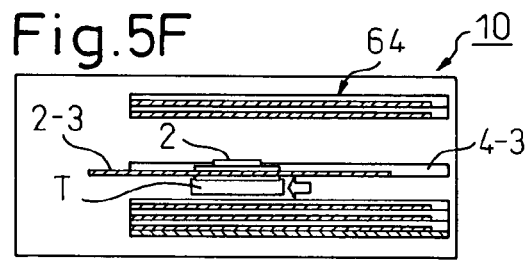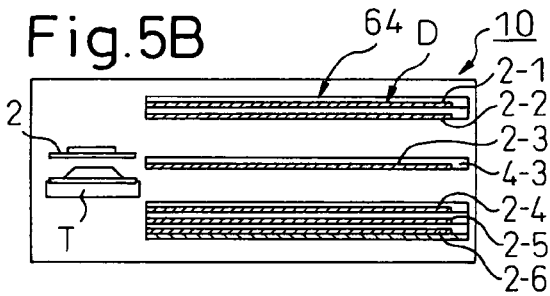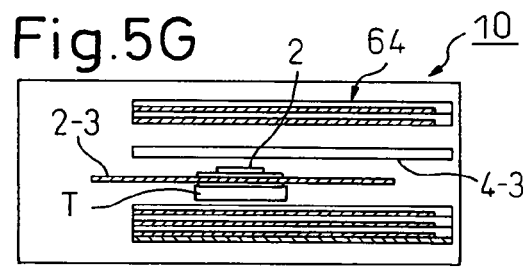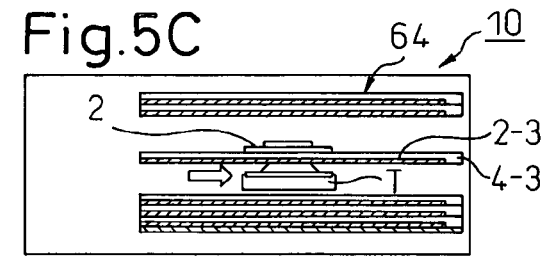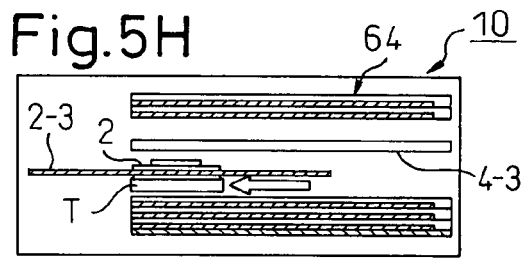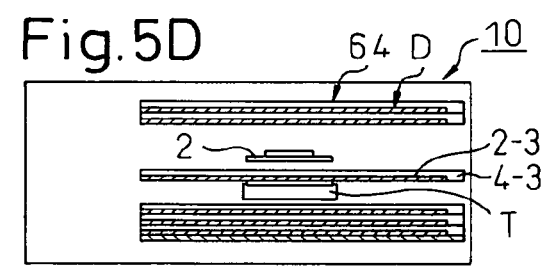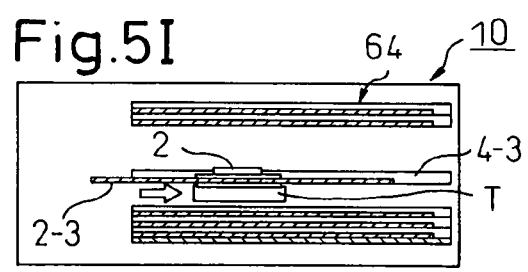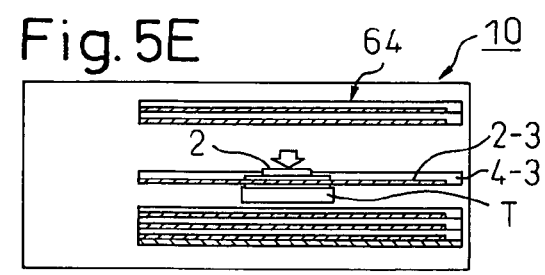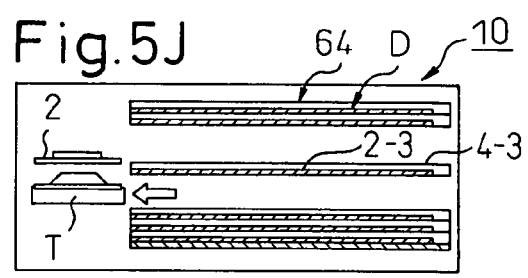

CLAMP MECHANISM FOR DISK-SHAPED RECORDING MEDIUM AND REPRODUCING APPARATUS FOR THE RECORDING MEDIUM

CROSS-REFERENCE TO RELATED APPLICATION

This application claims priority from, and incorporates by reference the entire disclosure of, Japanese Patent Applications
(1) No. 2004-060893, filed on Mar. 4, 2004, and
(2) No. 2005-015174, filed on Jan. 24, 2005.

BACKGROUND OF THE INVENTION

1. Field of the Invention

The present invention relates to a clamp mechanism for a disk-shaped recording medium and a reproducing apparatus for the recording medium and, more particularly, to a clamp mechanism for a disk-shaped recording medium that is used to clamp the disk-shaped recording medium onto a turntable for reproduction/recording (reproduction or recording) and a reproducing apparatus, for the disk-shaped recording medium, that is equipped with the clamp mechanism. Here, it is to be understood that the clamp mechanism comprises a clamper for rotatably holding the disk-shaped recording medium on the turntable, a clamper holder for holding the clamper, and a disk clamp portion formed integrally with the turntable and adapted to engage with the clamper.

2. Description of the Related Art

There are a wide variety of disk-shaped recording media, typical examples including the CD (Compact Disc) and the MD (MiniDisc) for recording musical pieces such as music and songs and the DVD (Digital Versatile Disc) for recording video. Of these types of disks, the CD and the DVD are of the same disk size; therefore, the disk-shaped recording medium here will be described by taking the CD as an example.

Usually, a disk-shaped recording medium (hereinafter sometimes simply called a disk) such as a CD is inserted in a disk player forming part of an audio system or the like, and played back to present musical pieces to the user for listening. In this case, if the disk player has a built-in automatic disk changer, a plurality of disks can be set in the changer, and musical pieces can be presented to the user for listening by automatically selecting and playing back the disks one at a time in the desired sequence.

To play back music from the disk on such a disk player (the procedure is the same for the case of recording), it is essential that the disk player be equipped with some means for correctly clamping the disk on the turntable for rotation. The means that plays an important part in the disk player is the disk clamp mechanism which rotatably clamps the disk on the turntable.

Known disk players include, for example, the one disclosed in Japanese Unexamined Patent Publication No. H06-203447. In the disk player disclosed in Japanese Unexamined Patent Publication No. H06-203447, the clamp mechanism for clamping the disk comprises the earlier mentioned clamper, the clamper holder, and the disk clamp portion formed integrally with the turntable. In the clamped condition, this disk clamp portion is positioned inside the clamper.

The disk placed on a moving table is clamped between the turntable and the clamper, and is rotated by a spindle motor. The turntable and the clamper are mounted on a common unit. This unit is mounted to a chassis via a spring. When the moving table moves from outside the apparatus to inside the apparatus (when inserting the disk), or from inside the apparatus to outside the apparatus (when ejecting the disk), the unit is located in a lower position, and when the moving table is drawn into the apparatus, the unit moves into an upper position where the turntable holds the disk thereon.

In the invention disclosed in Japanese Unexamined Patent Publication No. H06-203447, it is described that, as the turntable moves up and down, the moving table need not be provided with a means for moving the disk up and down; as a result, the moving table can be made thin in construction, and the overall size of the disk player can thus be reduced.

However, when mounting the thus constructed disk player, for example, in a vehicle, the disk player is usually installed in that portion of an instrument panel (dash panel) that is located between the driver's seat and the front passenger seat in the vehicle. As the space for mounting such automotive apparatus in a vehicle is extremely limited, severe size limitations are imposed on automotive apparatuses designed for mounting in a vehicle's dashboard (such apparatuses are called in-dash type apparatuses). Furthermore, as, traditionally, radio receivers and cassette players are installed as automotive audio apparatuses, the disk player, as a latecomer, must be further reduced in size, and the size reduction achieved by the disk player according to the invention disclosed in Japanese Unexamined Patent Publication No. H06-203447 has not been sufficient.

SUMMARY OF THE INVENTION

It is an object of the present invention to achieve a significant reduction in the size of a clamp mechanism for clamping a disk onto a turntable, and it is also an object of the invention to achieve a reduction in the overall size of a reproducing apparatus through the size reduction of the clamp mechanism. It is a further object of the present invention to provide a clamp mechanism having a construction such that the clamper of the clamp mechanism does not easily come off its position even when subjected to external forces.

The invention that achieves the above objects can be implemented in the following modes.

According to a first mode, there is provided a clamp mechanism for a disk-shaped recording medium comprising: a turntable for rotating the disk-shaped recording medium; a clamper capable of being clamped onto the turntable; and a clamper holder having a projecting part for holding the clamper in rotatable fashion, wherein the clamper holder is attached to the clamper by inserting at least a portion of the projecting part into a space formed within the clamper.

According to a second mode, there is provided a clamp mechanism for a disk-shaped recording medium, comprising: a turntable for mounting thereon the disk-shaped recording medium; a clamper capable of being clamped onto the turntable; and a clamper holder having a projecting part for holding the clamper in rotatable fashion, wherein the clamper has an elastically deformable movable piece as well as a space formed within the clamper, and the clamper holder is attached to the clamper by inserting at least a portion of the projecting part into the space.

According to a third mode, there is provided a reproducing apparatus for a disk-shaped recording medium, comprising: a turntable for mounting thereon the disk-shaped recording medium; a clamper capable of being clamped onto the turntable; and a clamper holder having a projecting part for holding the clamper in rotatable fashion, wherein the clamper holder is attached to the clamper by inserting at least a portion of the projecting part into a space formed within the clamper.

In one preferred embodiment of the clamp mechanism for the disk-shaped recording medium according to the second mode, the projecting part is provided at an end thereof with a flange having an outer diameter to be accommodated in the space, the chamber portion is provided with at least two engaging protrusions for preventing the flange from coming out of the space, and one of the engaging protrusions is an end portion of a movable piece, wherein the flange is pushed into the space in the chamber portion by causing the movable piece to deform, and the clamper holder is attached to the clamper by allowing the movable piece to return to a position where the movable piece was originally located before being deformed.

In another preferred embodiment of the clamp mechanism for the disk-shaped recording medium according to the second mode, the projecting part is provided at an end thereof with a flange having an outer diameter to be accommodated in the space, the chamber portion includes a cut-out portion formed by cutting out a portion of a sidewall thereof along a length just enough to allow the flange to pass through, at least one engaging protrusion for preventing the flange from coming out of the space is provided on a sidewall of an opening formed to expose the chamber space at a side thereof facing the clamper holder, and the cut-out portion and a portion of the clamper that faces the sidewall of the chamber portion is provided with an engaging member that closes the cut-out portion.

Preferably, in this case, in the portion of the clamper that faces the sidewall of the chamber portion, a first engaging hole is provided at a position facing the cut-out portion and second and third engaging holes are provided at positions equally distanced from the first engaging hole, and the engaging member is constructed from elastically deformable members comprising a head that serves the same function as the engaging protrusion for a main body, two arms, and one leg, wherein the head is inserted into the cut-out portion, the arms are inserted into the second and third engaging holes, and the leg is inserted into the first engaging hole. Here, the arms should be curved along the same direction as the direction along which the portion of the clamper that faces the sidewall of the chamber portion is curved.

According to the present invention, the following effects are achieved.

(1) The clamper supporter which protruded outside the clamper in the prior art is constructed as a clamper mounting shaft that can be accommodated into the space formed within the clamper. As a result, the vertical height of the disk player is reduced, achieving a reduction in the overall size of the disk player.

(2) Further, as will be described later, as the clamper portion containing the space can also be used for aligning the center with the turntable, the need for the prior art clamper tooth is eliminated.

(3) Furthermore, the need for the prior art clamper pressing portion is also eliminated.

(4) In a free condition in which the disk is not yet mounted on the turntable, vibration noise tends to occur due to vibrations; such vibration noise is suppressed by the construction of the invention in which the clamper mounting shaft is held fixed by the movable piece.

(5) In a clamped condition in which the disk is mounted on the turntable, the movable piece is easily disengageable from the clamper mounting shaft, and thus the friction occurring between the clamper and the clamper mounting shaft during the rotation of the disk D can be reduced to nearly zero.

BRIEF DESCRIPTION OF THE DRAWINGS

The present invention will be more clearly understood from the description as set forth below with reference to the accompanying drawings, wherein:

FIGS. 5A to 5J are side views for explaining how a disk is played back on the disk changer-equipped disk player shown in FIG. 4;

FIG. 13A is a plan view of the clamper, FIG. 13B is a perspective view of the clamper, FIG. 13C is a front view of the clamper as seen from the direction of arrow C in FIG. 13B, FIG. 13D is a side view of the clamper as seen from the direction of arrow D in FIG. 13B, FIG. 13E is a bottom view of the clamper, FIG. 13F is a perspective view of the bottom of the clamper, FIG. 13G is a bottom view of an engaging piece, FIG. 13H is a plan view of the engaging piece, FIG. 13I is a perspective view of the engaging piece as seen from the bottom side, FIG. 13J is a front view of the engaging piece as seen from the direction of arrow J in FIG. 13I, and FIG. 13K is a front view of the engaging piece as seen from the direction of arrow K in FIG. 13I;

DESCRIPTION OF THE PREFERRED EMBODIMENTS

Figure 1:
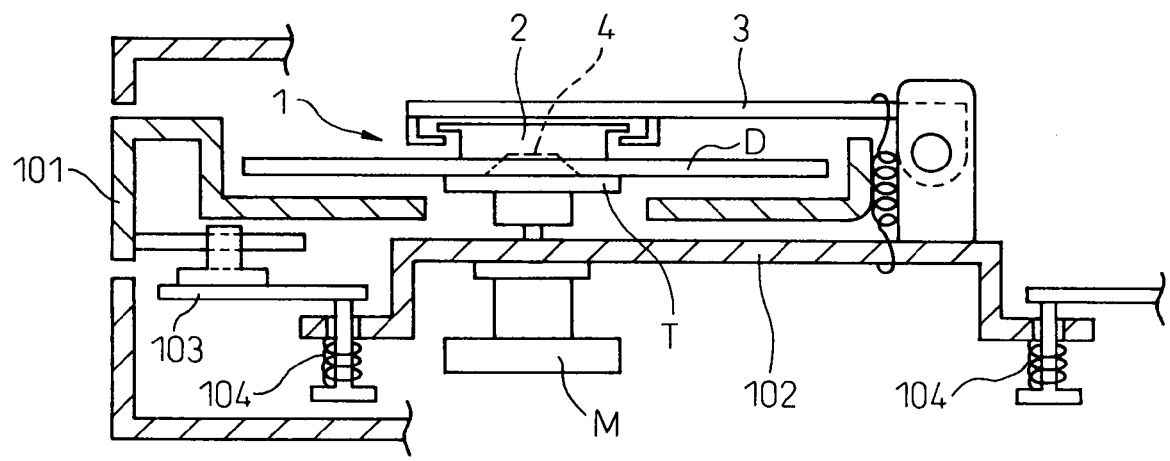
FIG. 1 is a transverse cross-sectional view of a disk player disclosed in Japanese Unexamined Patent Publication No. H06-203447.

Before describing the preferred embodiments of the present invention, the construction of a prior art clamp mechanism for a disk-shaped recording medium and the construction of a disk player as a reproducing apparatus for the recording medium will be described with reference to FIGS. 1 to 3. FIG. 1 is a transverse cross-sectional view of the prior art disk player disclosed in Japanese Unexamined Patent Publication No. H06-203447. The prior art disk clamp mechanism 1 comprises a clamper 2, a clamper holder 3, and a disk clamp portion 4 formed integrally with a turntable T. In the clamped condition, the disk clamp portion 4 is positioned inside the clamper 2 and is therefore not visible from the outside.

The disk D placed on a moving table 101 is clamped between the turntable T and the clamper 2, and is rotated by a spindle motor M. The turntable T and the clamper 2 are mounted on a common unit 102. This unit 102 is mounted to a chassis 102 via a spring 104. When the moving table 101 moves from outside the apparatus to inside the apparatus (when inserting the disk), or from inside the apparatus to outside the apparatus (when ejecting the disk), the unit 102 is located in the position lower than the position shown, and when the moving table 101 is drawn into the apparatus, the unit 102 moves into the position shown in the diagram where the turntable T holds the disk D thereon.

In the prior art disk player disclosed in Japanese Unexamined Patent Publication No. H06-203447, as the turntable T moves up and down, the moving table 101 need not be provided with a means for moving the disk up and down. As a result, in the prior art disk player disclosed in Japanese Unexamined Patent Publication No. H06-203447, the moving table 101 can be made thin in construction, and the overall size of the disk player can thus be reduced.

However, in the case of an automotive apparatus designed for mounting inside an automotive cabin, since the space for mounting the disk player is extremely limited, there is a need to further reduce the size of the disk player. Among the various factors that may contribute to the size reduction of the disk player, the present invention focuses attention on the clamp mechanism 1 to achieve the size reduction.

First, the conventional clamp mechanism employed in the prior art will be described with reference to FIG. 2.

Figure 2:
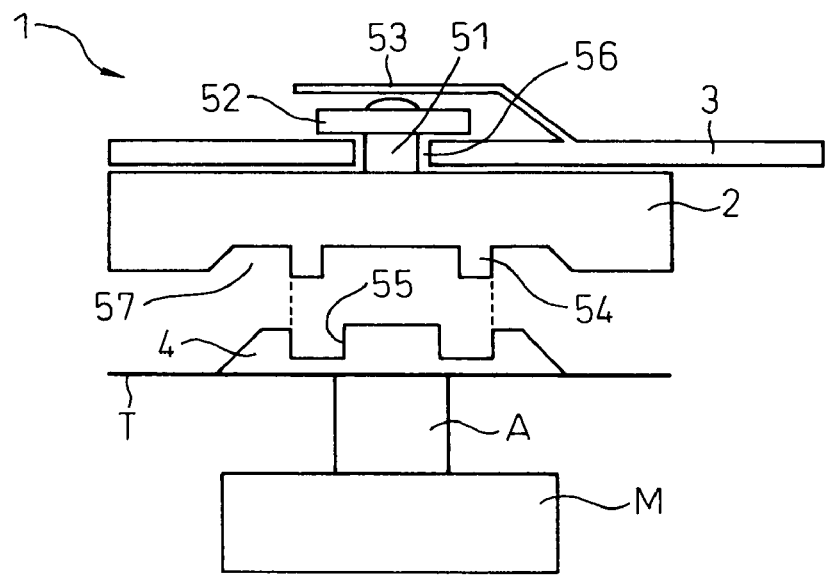
FIG. 2 is a transverse cross-sectional view showing one example of a conventional clamp mechanism according to the prior art.
Figure 3:
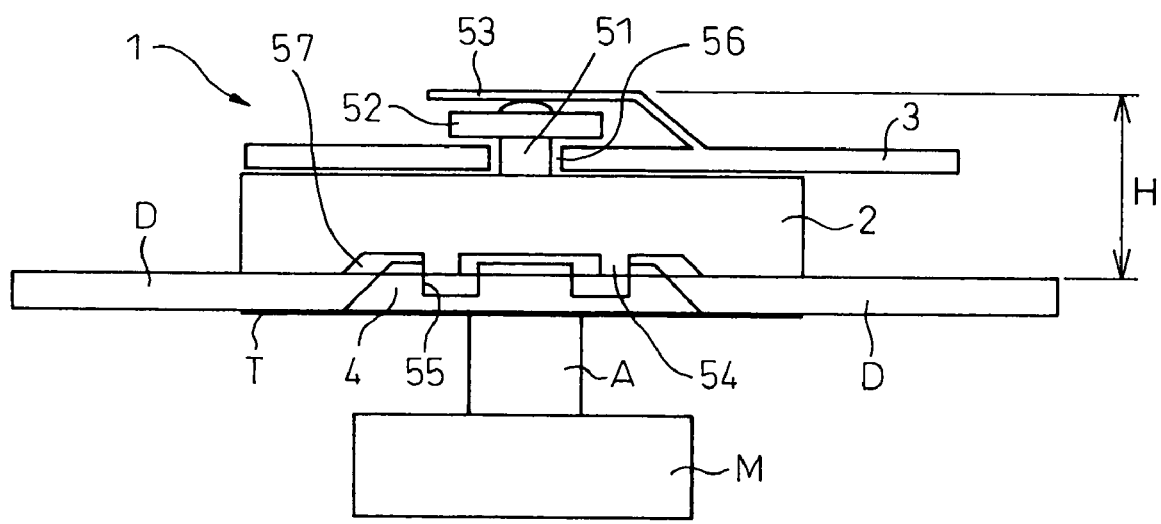
FIG. 3 is a transverse cross-sectional view showing the disk clamp mechanism of FIG. 2 in a clamped condition.

FIGS. 2 and 3 are transverse cross-sectional views showing one example of the conventional clamp mechanism 1. Here, FIG. 2 shows a free condition in which the disk D is not clamped, and FIG. 3 shows the clamped condition of the disk D. First, referring to FIG. 2, in the free condition in which the disk is not yet mounted on the turntable T, the clamper 2 of the clamp mechanism 1 is held separated from the turntable T.

The clamper 2 has a disk-like shape, and is provided at its center with a mounting shaft 51 formed in protruding fashion. The mounting shaft 51 is passed through a hole 56 formed through the clamper holder 3, and a flange-like clamper supporter 52 having an outer diameter larger than the through hole 56 is attached to a free end of the mounting shaft 51. The clamper 2 is supported in the clamper holder 3 in rotatable fashion by means of the mounting shaft 51 and the clamper supporter 52. The clamper holder 3 has a clamper pressing portion 53 for pressing the end of the mounting shaft 51. A recessed portion 57 having a ring-shaped clamper tooth 54 at its center is formed in the surface of the clamper 2 that faces the turntable T.

On the other hand, the turntable T is mounted on a rotating shaft A which rotates with the rotation of the spindle motor M, and the turntable T is thus rotated by the spindle motor M. The disk clamp portion 4 which engages with the clamper 2 is provided on the side of the turntable T that faces the clamper 2. The disk clamp portion 4 is shaped so that at least its end portion engages in the recessed portion 57 formed on the clamper 2, and is formed with a disk clamp groove 55 in which the clamper tooth 54 formed on the clamper 2 is engaged.

When playing back (or recording on) the disk D, the clamp mechanism 1 changes from the free condition of FIG. 2 to the clamped condition of FIG. 3. In this condition, the clamper 2 and the turntable T are brought closer together with the disk D held therebetween, and the clamper tooth 54 of the clamper 2 is engaged in the disk clamp groove 55. Accordingly, in this condition, the respective center axes are aligned with each other, and the clamper 2 rotates with the turntable T. At this time, the clamper 2 is firmly pressed onto the disk D from above by means of the clamper pressing portion 53. Thus, the disk D held securely by the clamp mechanism 1 rotates stably with the turntable T to perform playback/recording.

Here, as is apparent from FIG. 1, if the disk player is to be further reduced in size, the size reduction in the horizontal direction of the disk player has already reached its limit because of the maximum outer diameter of the disk D. On the other hand, when attention is paid to the vertical height of the disk player, it can be seen that there is room for reducing the size of the disk player by reducing the vertical height thereof.

In view of this, the present invention aims to reduce the size of the disk player by reducing the vertical height of the disk player, in particular, by reducing the vertical height of the clamp mechanism 1. That is, the present invention aims to reduce the vertical height H of the clamp mechanism 1 shown in FIG. 3.

Figure 4:
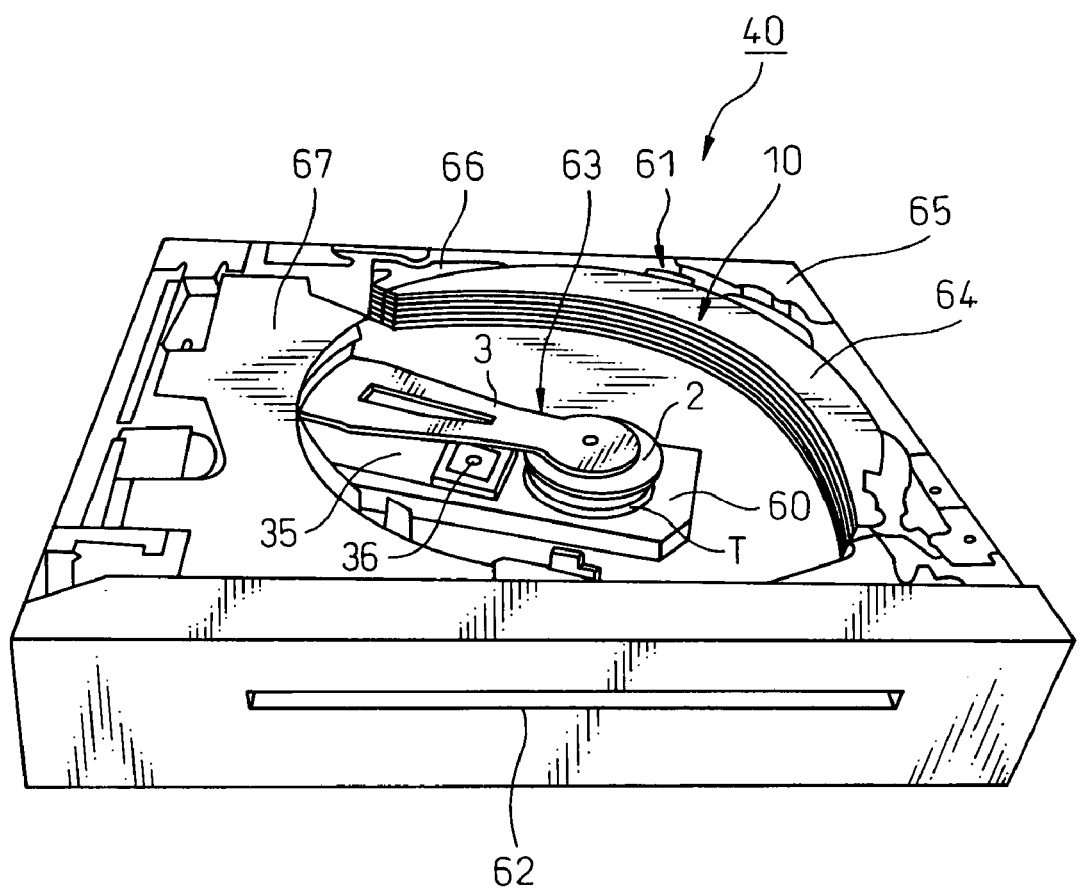
FIG. 4 is a perspective view showing a clamp mechanism according to the present invention and the construction of a disk player equipped with a disk changer.

Before describing the construction of the clamp mechanism 1 of the present invention, a description will be given of the construction of a disk player 40 equipped with the clamp mechanism 1 of the present invention. It is assumed that the disk player 40 hereinafter described has a built-in automatic disk changer 10 (hereinafter simply called the disk changer 10). FIG. 4 shows the construction of the disk player 40 equipped with the clamp mechanism 1 of the present invention; the condition before disks are loaded is shown here. The disk changer 10 built into the disk player 40 comprises a stocker 64 as a disk container capable of holding a plurality of disks inside the disk player 40 and capable of moving up and down inside the disk player 40, a swing arm 63 operable to withdraw a disk from the stocker 64 for playback and to return the disk to the stocker 64 after playing back, a driving unit 67 for the swing arm 63, a linear position sensor (not shown) for detecting the position of the stocker 64, and a lift mechanism 65 for moving the stocker up and down based on the output of the linear position sensor.

The swing arm 63 is constructed so that it turns by being driven by the driving unit 67, and comprises two major components, a frame 60 and a clamp arm (clamper holder) 3. A turntable T for rotating a disk is provided on an end portion of the frame 60, while an optical head 36 and a guideway 35 along which the optical head 36 moves are provided in the center portion of the frame 60. The base of the clamp arm 3 is attached to the frame 60 by way of a rotating shaft, and a clamper 2 for clamping the disk is rotatably attached to an end portion of the clamp arm 3. The end portion of the clamp arm 3 is turned toward the frame 60, causing the clamper 2 to clamp the disk firmly onto the turntable T.

The vertical position of the swing arm 63 in the disk player 40 does not change and remains constant. Accordingly, in order to allow the swing arm 63 to clamp a desired one of the disks held in the stocker 64, the stocker 64 is split in the vertical direction of the apparatus and moves. The stocker 64 comprises a single stocker base and a plurality of movable stockers as movable trays mounted thereon, each movable stocker being capable of holding one disk. The stocker 64 moves up and down inside the apparatus by means of the stocker lift mechanism 65. In order to allow the swing arm 63 to remove a desired one of the disks held in the stocker 64, the movable stockers forming the stocker 64 can be split vertically at a desired position by means of a stocker splitting mechanism 66.

Further, a disk pushing mechanism 61 for pushing out a selected one of the disks held in the stocker 64 is provided in the casing of the disk changer 40 behind the stocker 64 comprising the plurality of movable stockers. The height of the disk pushing mechanism 61 from the bottom surface of the disk changer 40 is fixed, and the stocker 64 is moved up and down so that the disk in the movable stocker located at a prescribed position can be pushed out by the disk pushing mechanism 61 and ejected through a disk insert/eject slot 62 of the disk changer 40.

Next, the operation of the disk changer 10 in the disk player 40 shown in FIG. 4, i.e., how the disk D is withdrawn from the stocker 64, played back, and returned to the stocker 64, will be described in detail with reference to FIGS. 5A to 5J which show the disk changer 10 as viewed from one side thereof. For a clear understanding of the splitting operation of the stocker 64, the following description deals with the case where, of the disks D held in the stocker 64, the third disk 2-3 from the top is selected for playback. As shown in FIG. 5A, the stocker 64 comprises six movable stockers 4-1 to 4-6 mounted on the stocker base 4-B, each of the movable stockers 4-1 to 4-6 being movable independently of the others. The movable stockers 4-1 to 4-6 can each hold one disk D thereon (the disks D are designated 2-1 to 2-6 from top to bottom as shown in FIG. 5B).

FIG. 5A shows the condition before the disk D is played back. Here, only the turntable T and the clamper 2 are shown to represent the swing arm 63, and other component members of the swing arm 63 are omitted. In the condition of FIG. 5, the turntable T and the clamper 2 are positioned outside the moving range of the disks D so that the disks D stored in the stocker 64 can be moved up and down in the disk changer 10. That is, FIG. 5A shows the condition before the disk to be played back is selected.

FIG. 5B shows the condition in which the disk D to be played back has been selected and the stocker 64 has been split. More specifically, FIG. 5B shows the condition in which the disk 2-3 held in the movable stocker 4-3, the third tray from the top, has been selected and the stocker 64 has been split into three sections. In this condition, a space into which to move the turntable T and a space into which to move the clamper 2 are respectively provided below and above the selected disk 2-3. The splitting mechanism for the stocker 64 has no direct relevance to the present invention, and therefore will not be described here.

FIG. 5C shows the condition in which the disk drive comprising the turntable T and the clamper 2 has moved into the space provided above and below the disk 2-3 after the condition of FIG. 5B. The turntable T and the clamper 2 are moved until they come to rest at the position of the center hole of the disk 2-3; after that, as shown in FIG. 5D, the third movable stocker 4-3 from the top moves down, and the disk 2-3 held in the movable stocker 4-3 is placed on the turntable T.

When the disk 2-3 is placed on the turntable T, the disk 2-3 is clamped by the clamper 2 as shown in FIG. 5E, and then, as shown in FIG. 5F, the disk 2-3 is drawn out of the stocker 4-3 as the turntable T moves. As the stocker 4-3 is crescent-shaped as shown in FIG. 4, when the turntable T is moved over a certain distance toward the playback position, the disk 2-3 is disengaged from the stocker 4-3. In this condition, the empty stocker 4-3 moves up as shown in FIG. 5G.

After that, the turntable T is further moved in the direction in which the disk 2-3 is being withdrawn, and comes to rest at the playback position shown in FIG. 5H. The disk 2-3 is played back at this position. When the playback ends, the turntable T moves toward the stocker 64, as shown in FIG. 5I, and the disk 2-3 is thus stored back into the movable stocker 4-3. By this time, the movable stocker 4-3 has already moved down to the position where it receives the disk 2-3.

When the disk 2-3 is stored in the movable stocker 4-3, the clamper 2 moves up to free the disk 2-3 on the turntable T, and the clamp mechanism comprising the turntable T and the clamper 2 moves back to the position where it does not interfere with the disk D held in the stocker, as shown in FIG. 5J, to end the playback operation. After that, the movable stocker 4-3 moves up to the position shown in FIG. 5C and, if another disk D is to be played back subsequently, the stocker 64 is split at a position different from that shown in FIG. 5B, and the same process as that shown in FIGS. 5B to 5J is repeated.

As described above, in the case of the autochanger 10 built into the disk player 40, the clamp mechanism comprising the turntable T and the clamper 2 is moved into the space provided between the disks D divided into the upper and lower stacks; therefore, if the vertical height of the clamp mechanism is large, the space provided between the disks D to accommodate the clamp mechanism becomes large, increasing the vertical dimension of the disk player 40. That is, in the case of an automotive disk player to be mounted in a limited space and used to play back many disks, it is important to be able to play back the disk in a confined space allowed for the splitting of the stocker, and therefore, reducing the thickness of the disk clamp mechanism is essential for reducing the overall size of the disk player.

Figure 6:
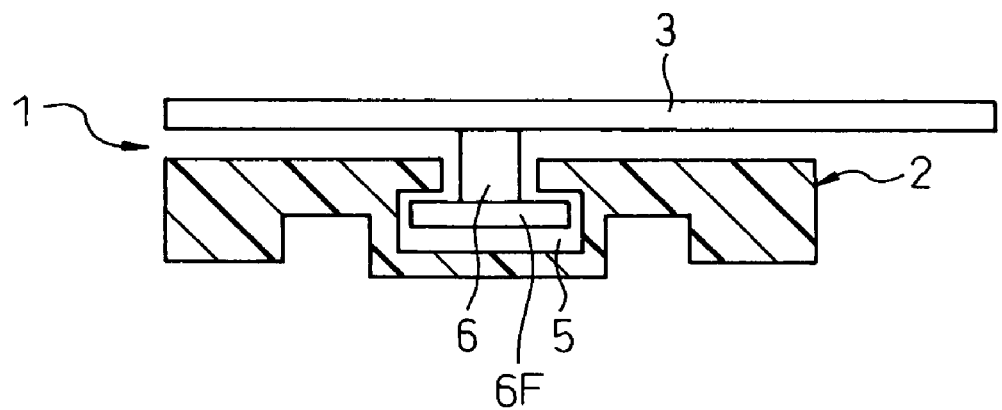
FIG. 6 is a transverse cross-sectional view showing an essential portion of the disk clamp mechanism according to the present invention.

FIG. 6 is a transverse cross-sectional view showing an essential portion of the disk clamp mechanism 1 according to the present invention. The clamp mechanism 1 according to the present invention is basically the same as the conventional clamp mechanism 1 shown in FIGS. 2 and 3, and comprises a disk clamp portion 4 formed integrally with the turntable T for mounting thereon the disk D shown in FIG. 3, a clamper 2 engageable with the disk clamp portion 4 and capable of clamping the disk D onto the turntable T, a clamper mounting shaft 6 for supporting the clamper 2 in rotatable fashion, and a clamper holder 3 for holding the clamper 2 by way of a flange portion 6F provided at the end of the clamper mounting shaft 6.

As shown, in the present invention, a space 5 is formed within the clamper 2 so that the flange portion 6F provided at the end of the clamper mounting shaft 6, which corresponds to the clamper supporter 52 shown in FIG. 3, can be accommodated within the space 5.

Figure 7:
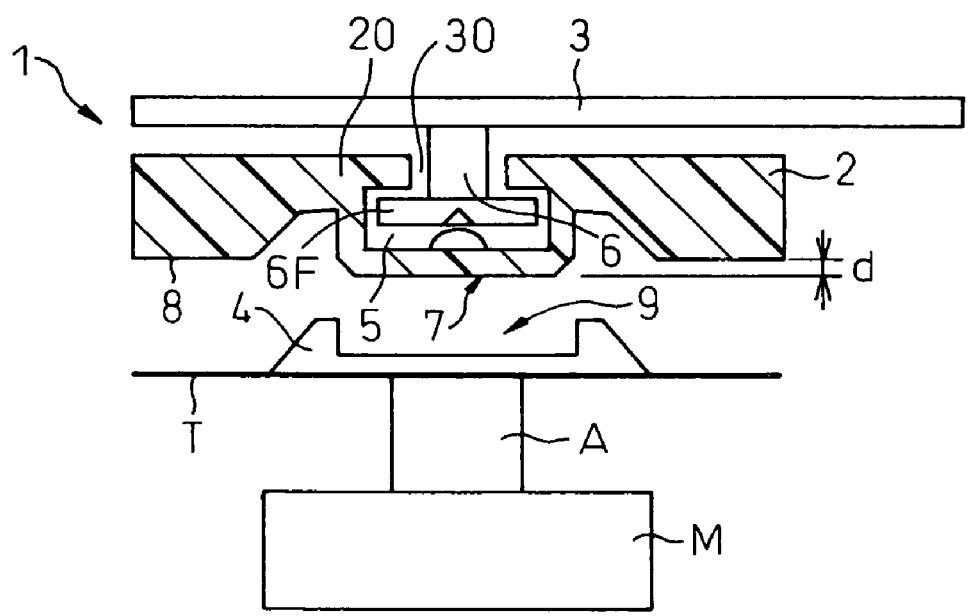
FIG. 7 is a transverse cross-sectional view showing a disk clamp mechanism according to an embodiment of the present invention.
Figure 8:
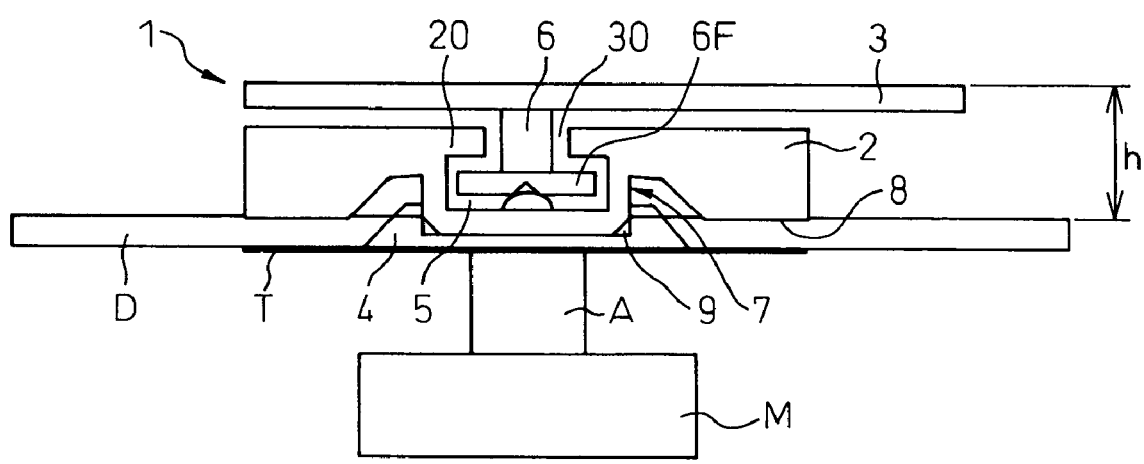
FIG. 8 is a transverse cross-sectional view showing the disk clamp mechanism according to the embodiment of the present invention.

FIG. 7 is a transverse cross-sectional view showing the disk clamp mechanism 1 according to one embodiment of the present invention, and FIG. 8 is a diagram showing the condition in which the disk D is clamped by the clamp mechanism 1 of FIG. 7. FIGS. 7 and 8 correspond to the previously given FIGS. 2 and 3, respectively. Throughout the drawings given herein, like component elements are designated by like reference numerals or signs. In FIG. 8, to facilitate understanding, portions which should be occluded and therefore not visible are also drawn with solid lines.

As shown in FIG. 7, the clamper 2 comprises a peripheral portion 8 capable of clamping the disk D and a chamber portion 7 containing the space 5 formed in the interior space in the center of the clamper 2. A ring-shaped groove is formed between the peripheral portion 8 and the chamber portion 7. On the other hand, the disk clamp portion 4 formed on the turntable T is provided in its center with a recessed groove portion 9 engageable with the chamber portion 7 of the clamper 2.

The peripheral portion 8 has a ring-shaped flat surface when viewed from the turntable T, and in the clamped condition in which the disk D is clamped by the clamper 2, this peripheral portion 8 presses the disk D from above to prevent the disk D from flipping out during playback/recording. Further, since it is desirable that, in the clamped condition the chamber portion 7 engaged deeper into the recessed groove portion 9 of the disk clamp portion 4, a height difference d is provided between the top face of the chamber portion 7 and the surface of the peripheral portion 8.

In the present invention, as the clamper 2 has the chamber portion 7 where the space 5 is formed and, in the clamped condition, the chamber portion 7 engages into the recessed groove portion 9 of the disk clamp portion 4, the maximum height h of the clamp mechanism 1 as measured from the disk D in the clamped condition is smaller than the height H of the same portion shown in FIG. 3. Accordingly, the present invention offers a first effect that the overall size of the disk player can be reduced. Further, the provision of the chamber portion 7 offers a second effect. That is, the need for the clamper tooth (indicated at 54 in FIGS. 2 and 3) in the prior art is eliminated. The reason is that the chamber portion 7 itself also serves the function of positioning the clamper 2 by engaging with the recessed groove portion 9.

To achieve this, the chamber portion 7 of the clamper 2 is formed so as to be engageable with the recessed groove portion 9 of the disk clamp portion 4 by leaving a slight gap therebetween so that the center of rotation of the clamper 2 substantially coincides with the center of rotation of the turntable T. In this case, the circumferential edge of at least one of the opposing surfaces of the chamber portion 7 and the recessed groove portion 9 is tapered in order to enable the chamber portion 7 to engage smoothly into the recessed groove portion 9. This will be explained with reference to FIG. 9.

Figure 9A:
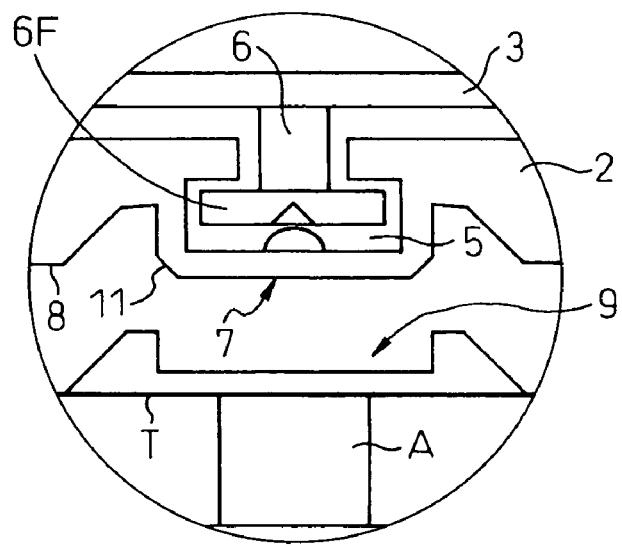
FIG. 9A is an enlarged view of a portion of the clamp mechanism, showing one example of how the edges of a chamber bottom and a recessed groove are formed.
Figure 9B:
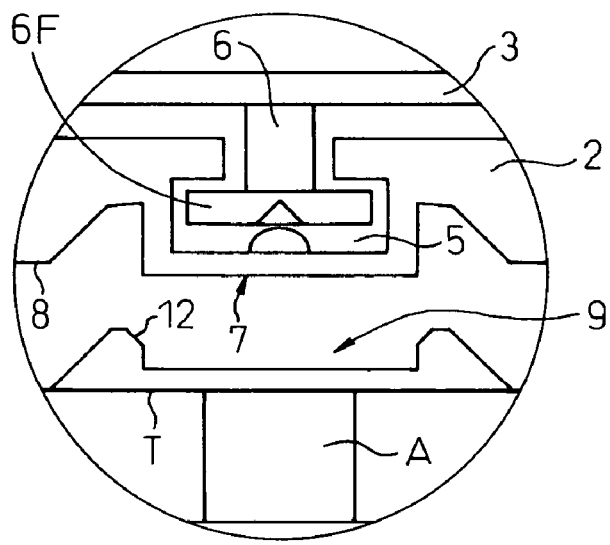
FIG. 9B is an enlarged view of the same portion of the clamp mechanism, showing another example of how the edges of the chamber bottom and the recessed groove are formed.
Figure 9C:
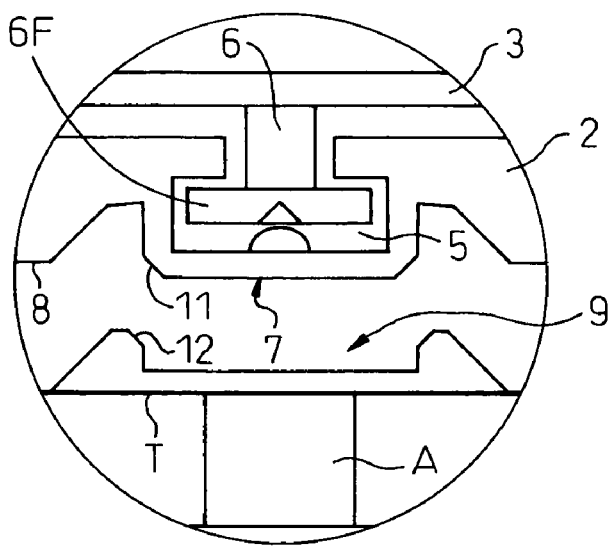
FIG. 9C is an enlarged view of the same portion of the clamp mechanism, showing still another example of how the edges of the chamber bottom and the recessed groove are formed.

FIGS. 9A, 9B, and 9C are diagrams showing specific examples of the circumferential edge of the bottom surface of the chamber portion 7 and the circumferential edge of the recessed groove portion 9; here, the applicable portion in FIG. 7 is shown in enlarged form. In the specific example shown in FIG. 9A, a tapered portion 11 is formed along the circumferential edge of the bottom surface of the chamber portion 7. In the specific example shown in FIG. 9B, a tapered portion 12 is formed along the circumferential edge of the recessed groove portion 9. In the specific example shown in FIG. 9C, the tapered portions 11 and 12 are formed, the former along the circumferential edge of the bottom surface of the chamber portion 7 and the latter along the circumferential edge of the recessed groove portion 9. In the embodiment shown in FIGS. 7 and 8, the specific example shown in FIG. 9A is employed, but it is of course possible to employ the specific example shown in FIG. 9B or 9C. The tapered portions 11 and 12 are formed in the shape of so-called cut faces or rounded faces (curved faces).

Here, the circumferential edges of the chamber portion 7 and the recessed groove portion 9 may take any suitable shape, such as a rectangle, hexagon, or circle, when viewed from the top, as long as they are similar to each other, but in the embodiment of the present invention, the edges are circular in shape because the clamper 2 and the disk clamp portion 4 are both circular in shape when viewed from the top.

In this case, as shown in FIGS. 7 and 8, the chamber portion 7 and the space 5 are both circular in shape when viewed from the top. Accordingly, of the clamper mounting shaft 6 of T-shaped cross section, the portion (corresponding to the horizontal bar in the letter T) positioned within the space 5 is formed as the flange portion 6F generally circular in shape. The hole 30 opened through the ceiling of the chamber portion 7 is also circular in shape.

Here, the inner diameter of the through hole 30 must be made smaller than the outer diameter of the flange portion 6F of the clamper mounting shaft 6 positioned within the space 5. The reason is that the flange portion 6F must be prevented from coming out through the hole 30 when the clamper holder 3 disengages the clamper 2 from the disk clamp portion 4. However, when the inner diameter of the through hole 30 is made smaller than the outer diameter of the flange portion 6F, the flange portion 6F formed at the end of the clamper mounting shaft 6 of the clamper 2 cannot be inserted into the space 5 in the chamber portion 7 during assembling at the factory, unless some ingenious means is devised.

In view of this, in the present invention, the through hole 30 is formed in the following way. First, a fitting portion 20 (to be described in detail with reference to FIG. 11) for allowing the flange portion 6F of the clamper mounting shaft 6 to be fitted into the space 5 is provided in the chamber portion 7. The fitting portion 20 has a movable piece 21 (to be described later) which can be elastically deformed with at least a portion thereof spreading when the flange portion 6F is being fitted. In this way, the flange portion 6F of the clamper mounting shaft 6 can be easily pushed into the space 5 in snap fit fashion.

At this time, play is formed between the fitting portion 20 and the clamper mounting shaft 6, as shown in FIG. 7. In the case of an automotive disk reproducing apparatus, vibration noise occurs from the portion of the play due to the vibration of the automobile, giving discomfort to the user.

There is therefore a need to provide a fastening means for fastening the clamper mounting shaft 6 to the clamper 2 to prevent generation of such vibration noise. The fastening means, however, must be made so that the clamper mounting shaft 6 can be unfastened from the clamper 2 when playing back or recording on a disk. The reason is that, if the clamper mounting shaft 6 remained fastened to the clamper 2 during disk playback/recording, the disk D cannot be rotated freely.

In view of the above situation, the movable piece 21 of the present embodiment is made to elastically press the clamper mounting shaft 6 and fix it in place in the free condition in which the disk D is not clamped by the clamper 2, while on the other hand, in the clamped condition in which the disk D is clamped by the clamper 2, the movable piece 21 is disengaged and moved away from the clamper mounting shaft 6 (see FIG. 11).

Further, a protrusion is formed on the bottom surface of the recessed groove portion 9 (as will be described in detail with reference to FIG. 11), and the movable piece 21 is caused to disengage from the clamper mounting shaft 6 as the former comes into contact with the protrusion in the clamped condition in which the disk D is clamped by the clamper 2. The structure of the fitting portion 20 and the structure of the protrusion will be described with reference to the drawings.

Figure 10A:
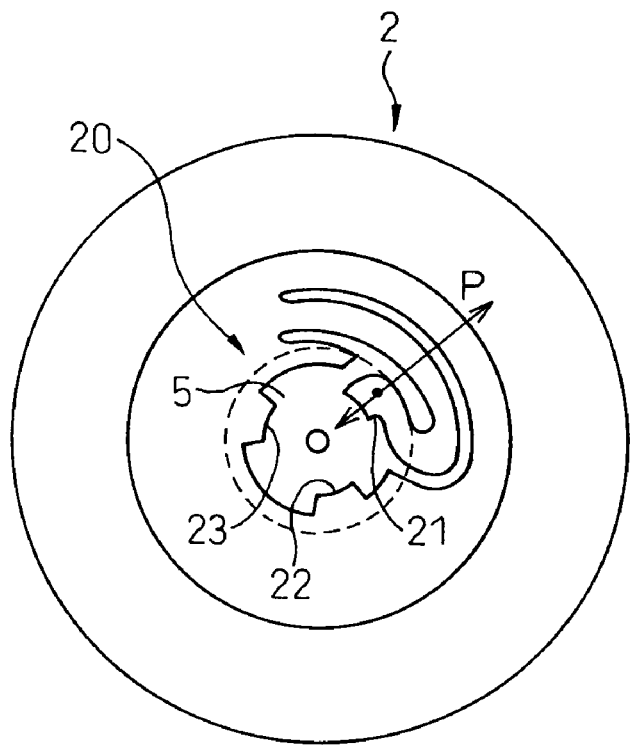
FIG. 10A is a plan view showing one example of a fitting portion in FIGS. 7 and 8.
Figure 10B:
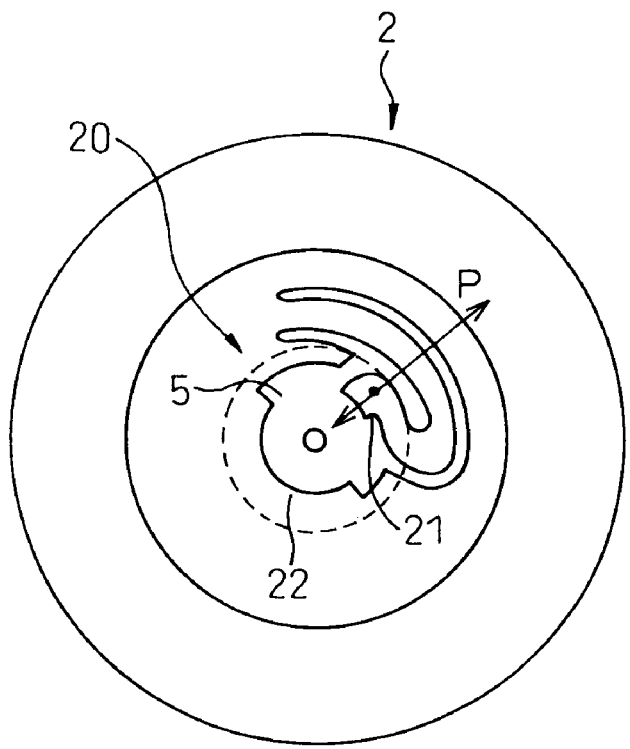
FIG. 10B is a plan view showing another one example of the fitting portion in FIGS. 7 and 8.

FIGS. 10A and 10B each show an example in which the fitting portion 20 shown in FIGS. 7 and 8 is provided with the movable piece 21; the free condition in which the disk D is not clamped by the clamper 2 is shown here. The movable piece 21 is integrally formed with the clamper 2 by using the same material as the clamper 2. The movable piece 21 is provided with a long arm so as to be elastically deformable, the arm being folded back at an intermediate point along it.

In FIG. 10A, the fitting portion 20 formed, for example, from a synthetic resin comprises the movable piece 21, a first fixed piece 22, and a second fixed piece 23, and fixes the clamper mounting shaft 6 shown in FIG. 7 or 6 at three points by means of the three pieces (21, 22, and 23) each protruding in a flange-like manner. The first and second fixed pieces 22 and 23 may be joined together and formed as a single fixed piece 22, as shown in FIG. 10B.

Of the three pieces, the movable piece 21 as a whole is formed from a large long U-shaped thin piece so as to be elastically deformable, as described above. The end portion of the thus formed movable piece 21 can be substantially displaced in directions indicated by a double-headed arrow P. Accordingly, when the flange portion 6F of the clamper mounting shaft 6 is being pushed into the space 5 (at the time of assembling), the movable piece 21 is displaced and spread outwardly from the center, creating a space through which the clamper mounting shaft 6 and the flange portion 6F thereof can be completely pushed into the space 5. When the flange portion 6F is completely pushed into the space 5, the movable piece 21 returns to its original shape. The small circle drawn in the center of the space 5 in FIGS. 10A and 10B indicates the hemispherical protrusion formed at the center of the inside bottom surface of the chamber portion 7 shown in FIGS. 7 and 6.

Accordingly, the hemispherical protrusion (small circle) and its surrounding area shown in each of FIGS. 10A and 10B indicate that the inside bottom surface of the chamber portion 7 located behind the plane of the figure is revealed. The inner sidewall of the chamber portion 7 is indicated by a dashed circle in FIGS. 10A and 10B.

From the above description, it can be understood that the clamper mounting shaft 6 and the flange portion 6F thereof can be easily fitted into the space 5 in the chamber portion 7 in snap-fit fashion. In this case, when the disk D is not loaded (the free condition), if there is play between the clamper mounting shaft 6 and the fitting portion 20 as shown in FIG. 7, the previously mentioned noise generation problem occurs. The structure of the present invention that solves this problem will be described with reference to drawings.

Figure 11A:
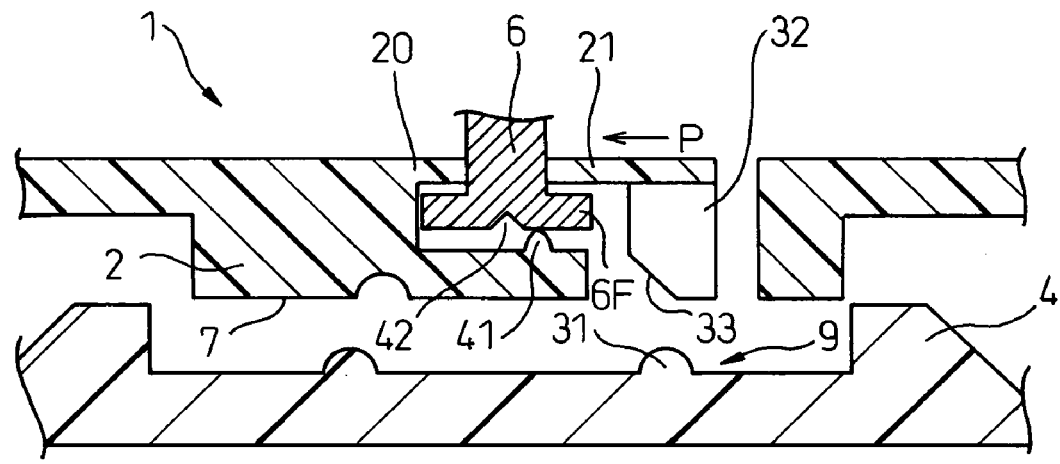
FIG. 11A is a transverse cross-sectional view showing the disk clamp mechanism in a disk free condition.
Figure 11B:
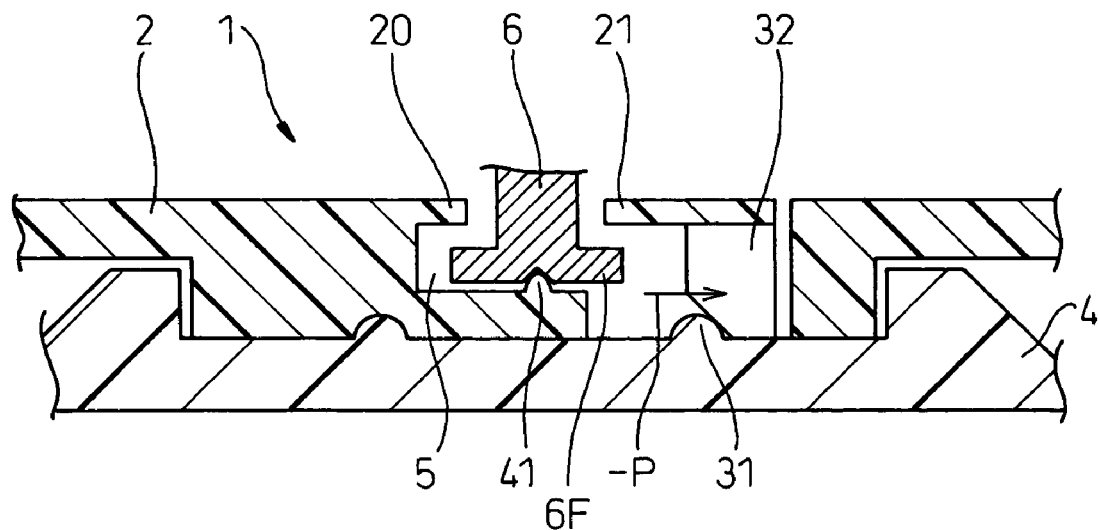
FIG. 11B is a transverse cross-sectional view showing the disk clamp mechanism in a disk clamped condition.

FIGS. 11A and 11B are transverse cross-sectional views showing the clamp mechanism in the free condition, in which the disk is not loaded, and in the clamped condition, respectively. In the figures, the disk is not shown. Referring to FIG. 11A, in the free condition the movable piece 21 is elastically pressing the clamper mounting shaft 6 in the direction P to hold it fixed in position; therefore, in this condition, the previously mentioned noise generation cannot occur.

On the other hand, referring to FIG. 11B, in the clamped condition the movable piece 21 is disengaged and moved away from the clamper mounting shaft 6, allowing the clamper 2 to rotate smoothly without friction. To describe how this works in a little more detail, as the clamper 2 moves toward the disk clamp portion 4 and engages into the recessed groove portion 9 of the disk clamp portion 4, the tapered portion 33 formed on the supporting base 32 of the movable piece 31 comes into contact with the protrusion 31 generally formed in the shape of a hemispherical ridge, and the tapered portion 33 is thus displaced in the direction –P opposite to the direction P. With this displacement, the base 32, and hence the movable piece 21, is also displaced in the direction –P, allowing the clamper 2 to rotate in a virtually noncontacting relationship with the clamper mounting shaft 6.

In the above noncontacting rotation (FIG. 11B), the clamper 2 should be made to rotate with its center axis substantially aligned with the center axis of the clamper mounting shaft 6.

Accordingly, in the embodiment of the present invention, a protrusion 41 formed in a substantially semispherical shape is provided at the center of the bottom surface of the chamber portion 7, as shown in FIGS. 11A and 11B. To correspond with this, a recess 42 for accepting the protrusion 41 therein to achieve positioning when the clamper mounting shaft 6 and the flange portion 6F thereof are placed into the space 5 is formed at the center of the bottom surface of the end portion of the clamper mounting shaft 6.

Thus, the clamper 2 (and hence, the disk D) is allowed to rotate stably without any friction and without being displaced off-center.

Figure 12A:
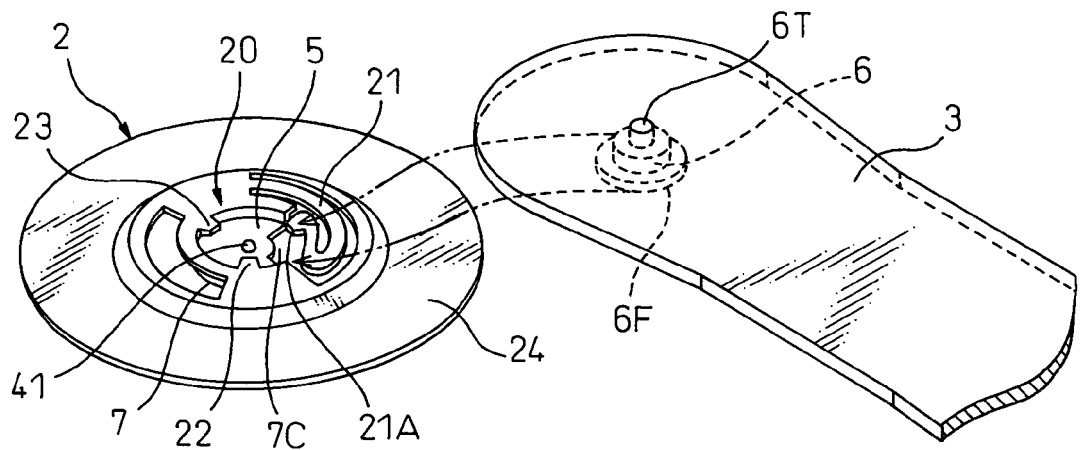
FIG. 12A is a perspective view of an assembly, showing a further example of the fitting portion whose structure has been shown in FIGS. 10A and 10B, and illustrating how a clamper is fitted onto a clamper mounting shaft of a clamper holder.
Figure 12B:
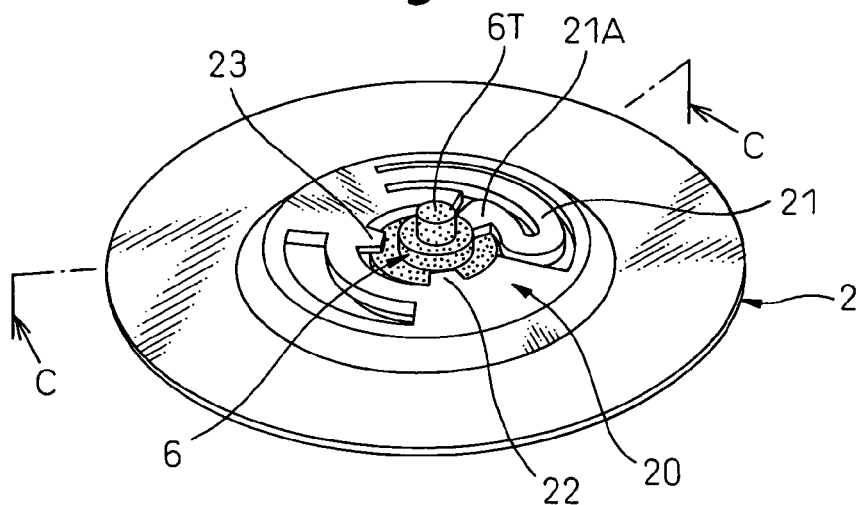
FIG. 12B is a perspective view showing the further example of the fitting portion whose structure has been shown in FIGS. 10A and 10B, in a condition after the clamper has been fitted onto the clamper mounting shaft of the clamper holder, the clamper holder being not shown.
Figure 12C:
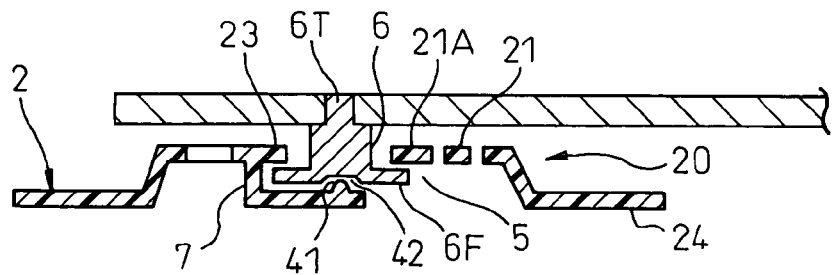
FIG. 12C is a cross-sectional view taken along line C-C in FIG. 12B.
Figure 13A:
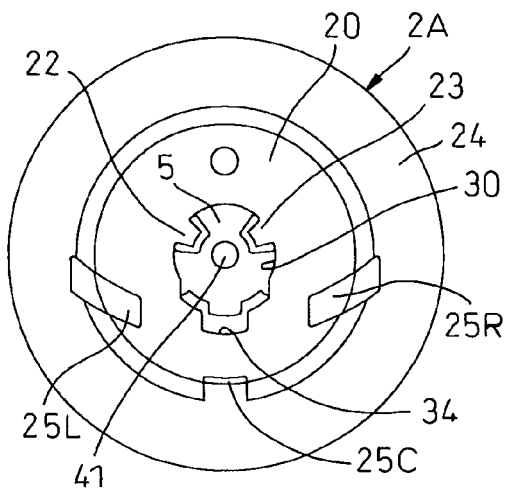
FIGS. 13A to 13K are diagrams showing another embodiment of the present invention in which the clamper is constructed from two separate members.
Figure 13B:
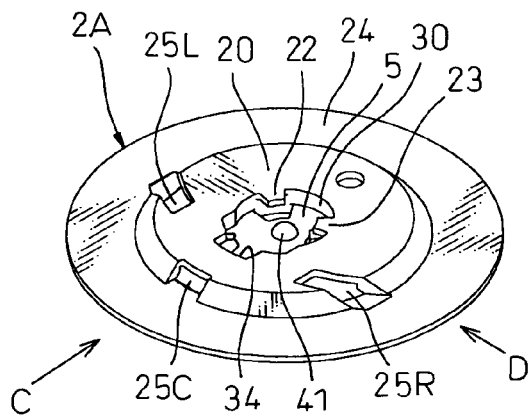
Figure 13C:
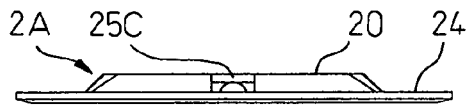
Figure 13D:
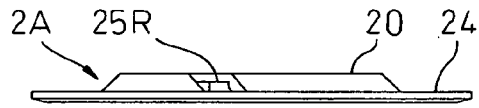
Figure 13E:
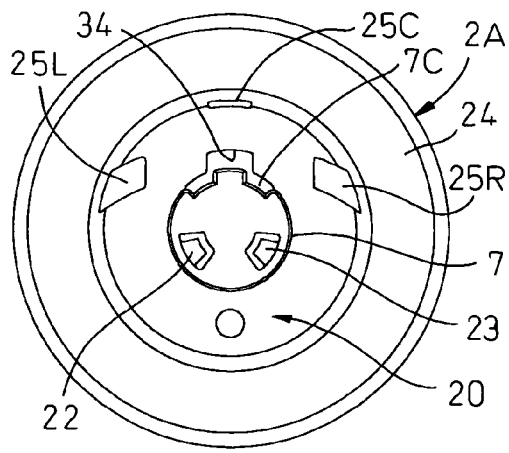
Figure 13F:
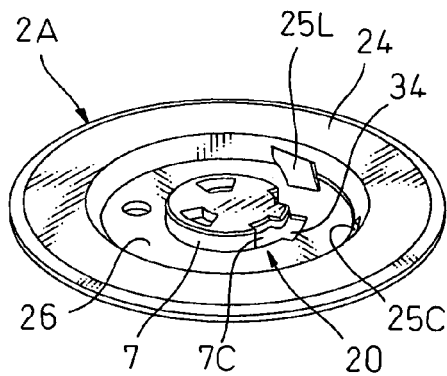
Figure 13G:
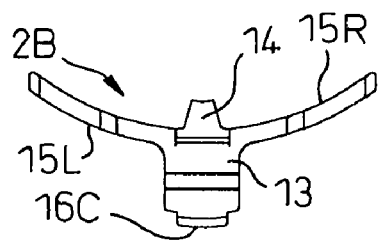
Figure 13H:
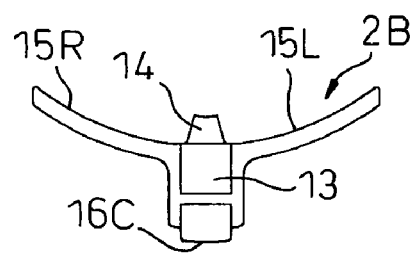
Figure 13I:
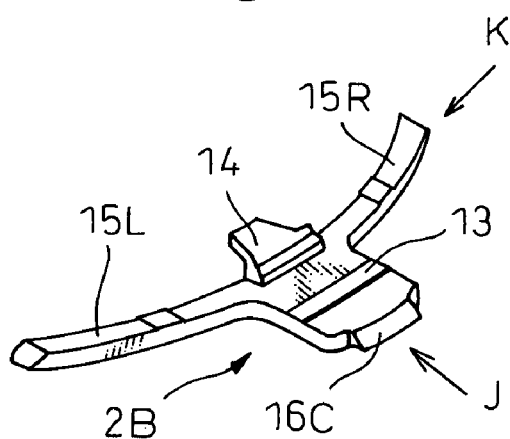
Figure 13J:
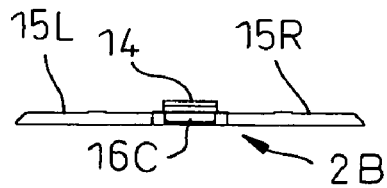
Figure 13K:
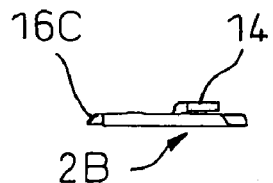

FIGS. 12A, 12B, and 12C are diagrams showing another example of the fitting portion 20 whose structure has been shown in FIGS. 10A to 11B. The movable piece 21 of the clamper 2 described with reference to FIGS. 10A to 11B has been constructed so as to urge and securely hold the clamper mounting shaft 6 in cooperation with the first and second fixed pieces 22 and 23 in the disk free condition. Further, the tapered portion 33 has been formed on the base 32 of the movable piece 21, and the protrusion 31 has been formed the recessed groove portion 9 of the disk clamp portion 4.

On the other hand, in the embodiment shown in FIGS. 12A to 12C, the movable piece 21 has the same thickness as that of the ceiling of the fitting portion 20 which is formed so as to rise from the disk pressing portion 24 of the clamper 2, and the base 32 is omitted from the movable piece 21. Further, the ends of the first and second fixed pieces 22 and 23 and the end 21A of the movable piece 21 are located on the same circumference, and the diameter of the circumference is larger than the diameter of the clamper mounting shaft 6 inserted into the space 5 in the chamber portion 7. The protrusion 41 is formed on the bottom surface of the space 5, as in the embodiment described with reference to FIG. 11.

Furthermore, the outer circumferential face and the bottom surface of the chamber 7 located near the position directly below the end 21A of the movable piece 21 are cut out along a predetermined length to provide a cut-out portion 7C. The inner diameter of the space 5 is made larger than the diameter of the flange portion 6F provided at the end of the clamper mounting shaft 6, but the horizontal width of the cut-out portion 7C is made slightly smaller than the diameter of the flange portion 6F. On the other hand, the clamper mounting shaft 6 rigidly attached to the end portion of the clamper holder 3 is provided, at its end, with the flange portion 6F and, at its base, with a mounting portion 6T which is attached to the clamper holder 3 by swaging or like means.

To attach the clamper 2 to the end portion of the clamper holder 3, the movable piece 21 is pressed to deform downward by the flange portion 6F of the clamper mounting shaft 6 attached to the end portion of the clamper holder 3 and, with the cut-out portion 7C of the chamber portion 7 exposed, the flange portion 6F is placed against the cut-out portion 7C and then pushed in the direction of the space 5, causing the chamber portion 7 to deform; in this way, the flange portion 6F is pushed through the cut-out portion 7C into the space 5 in the chamber portion 7. After pushing the flange portion 6F into the space 5, the movable piece 21 deformed under the flange portion 6F is then deformed outwardly so as to ride over the outer circumference of the flange portion 6F, thus positioning the end portion 21A of the movable piece 21 above the flange portion 6F, that is, the moving piece 21 thus returns to its original position.

The resulting condition is shown in FIGS. 12B and 12C. In FIG. 12B, only the clamper mounting shaft 6, excluding the clamper holder 3, is shown by stippled shading. In this embodiment, when the clamper 2 is fitted onto the clamper mounting shaft 6, play is provided between the clamper 2 and the clamper mounting shaft 6, allowing the clamper 2 to move in the horizontal direction relative to the clamper mounting shaft 6 by a distance equal to the difference between the outer diameter of the clamper mounting shaft 6 and the diameter of the virtual circle defined by the ends of the first and second fixed pieces 22 and 23 and the end 21A of the movable piece 21. Further, as the diameter of the virtual circle defined by the ends of the first and second fixed pieces 22 and 23 and the end 21A of the movable piece 21 is smaller than the diameter of the flange portion 6F placed in the space 5, the clamper 2 is prevented from being disengaged from the clamper mounting shaft 6.

When clamping the disk, the protrusion 41 formed in protruding fashion on the bottom surface of the chamber portion 7 is engaged into the recess 42 formed in the end portion of the clamper mounting shaft 6 to achieve positioning, as in the embodiment described with reference to FIG. 11. In this way, as in the embodiment described with reference to FIGS. 11A and 11B, the clamper 2 thus clamping the disk is allowed to rotate stably.

FIGS. 13A to 13K show another embodiment of the present invention in which the clamper 2 is constructed from two separate members (a clamper main body 2A and an engaging piece 2B). First, the structure of the clamper main body 2A will be described. FIGS. 13A to 13F are a plan view, a perspective view as seen from above, a front view as seen from the direction of arrow C in FIG. 13B, a side view as seen from the direction of arrow D in FIG. 13B, a bottom view, and a perspective view as seen from the bottom side, respectively, of the clamper main body 2A.

The clamper main body 2A is formed from an elastically deformable synthetic resin, as in the foregoing embodiment. As can be seen from FIGS. 13A to 13F, the clamper main body 2A comprises a circular disk pressing portion 24, a fitting portion 20 having the same thickness as that of the disk pressing portion 24 and formed so as to rise from it, and a chamber portion 7 having a space 5 formed in the center of the back of the fitting portion 20 in such a manner as not to protrude from the disk pressing portion 24, and a ring-shaped groove 26 is formed between the chamber portion 7 and the disk pressing portion 24.

A portion of the sidewall of the chamber portion 7 is cut out to form a cut-out portion 7C, and a circular through hole 30 is formed in the ceiling of the chamber portion 7, i.e., in the fitting portion 20. The outer circumferential portion of the through hole 30 that is adjacent to the cut-out portion 7C is cut out to form a guide hole 34. Further, the through hole 30 is provided, at positions equally distanced to the right and left from the guide groove 34, with a first fixed piece 22 and a second fixed piece 23 as engaging protrusions protruding toward the space 5 in the through hole 30.

On the other hand, the outer circumferential portion of the ring-shaped groove 26 formed between the chamber portion 7 and the disk pressing portion 24 is provided with a first engaging hole 25C at a position that faces the cut-out portion 7C of the chamber portion 7, and also with second and third engaging holes 25L and 25R at positions equally distanced from the first engaging hole 25C. Further, the protrusion 41 is formed on the bottom surface of the space 5 in the chamber portion 7, as in the embodiment described with reference to FIGS. 12A to 12C.

Next, the structure of the engaging piece 2B attached to the clamper main body 2A will be described. The engaging piece 2B also is formed from an elastically deformable synthetic resin. FIGS. 13G to 13K are a bottom view, a plan view, a perspective view as seen from the bottom side, a front view as seen from the direction of arrow J in I, and a side view as seen from the direction of arrow K in I, respectively, of the engaging piece 2B.

The engaging piece 2B is attached to the engaging holes 25C, 25L, and 25R provided in the clamper main body 2A, and comprises, as shown in FIGS. 13G to 13K, a main body 13, a head 14 formed in protruding fashion on one longitudinal end of the main body 13, a pair of arms 15L and 15R extending to the left and right outwardly of the main body 13 from positions thereof near the head 14 and curving toward the head 14, and a leg 16C formed in protruding fashion on the end of the main body 13 opposite from the head 14. The head 14 is formed in such a manner as to be raised from the main body 13, and the leg 16C has a tapered face.

Figure 14A:
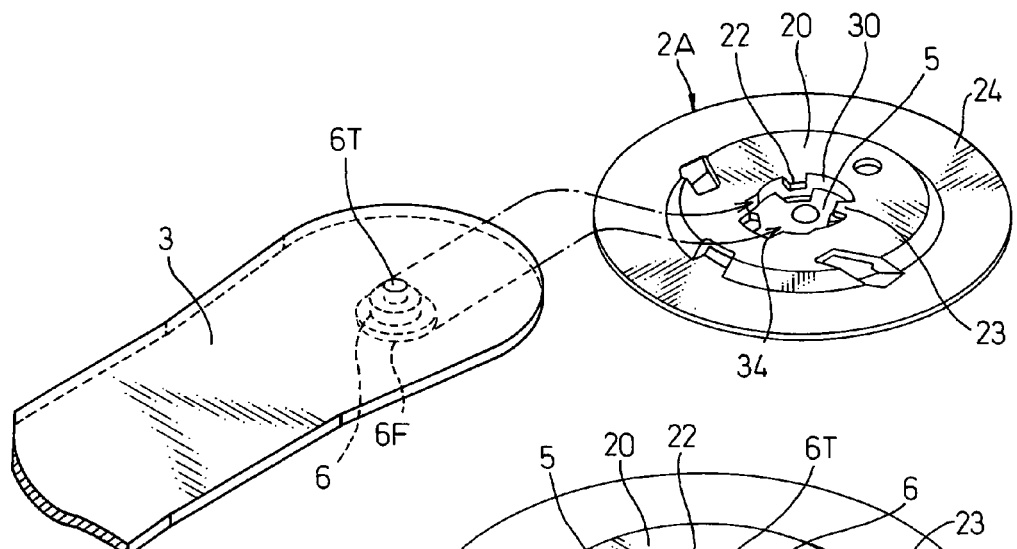
FIG. 14A is a perspective view of an assembly, illustrating how the clamper shown in FIGS. 13A to 13F is fitted onto the clamper mounting shaft of the clamper holder.

To attach the clamper main body 2A to the end portion of the clamper holder 3, the flange portion 6F of the clamper mounting shaft 6 attached to the end portion of the clamper holder 3 is pushed along the guide groove 34 in the through hole 30 of the clamper main body 2A obliquely into the space 5, as shown in FIG. 14A. At this time, the flange portion 6F is pushed in so that it forces its way along the lower faces of the first and second fixed pieces 22 and 23. Then, the through hole 30 deforms, allowing the flange portion 6F to easily slip into the space 5.

Figure 14B:
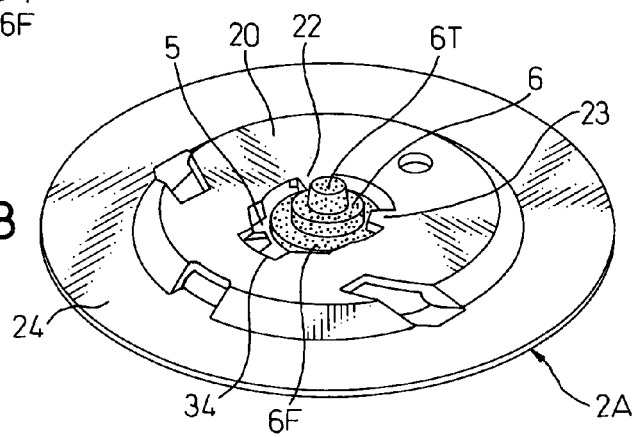
FIG. 14B is a perspective view showing a condition after the clamper has been fitted onto the clamper mounting shaft of the clamper holder, the clamper holder being not shown.
Figure 14C:
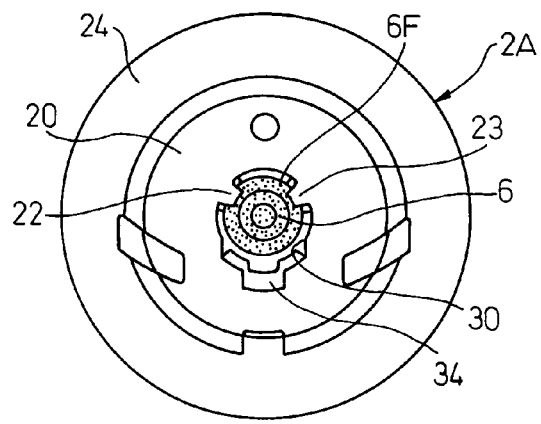
FIG. 14C is a plan view of FIG. 14B.
Figure 14D:
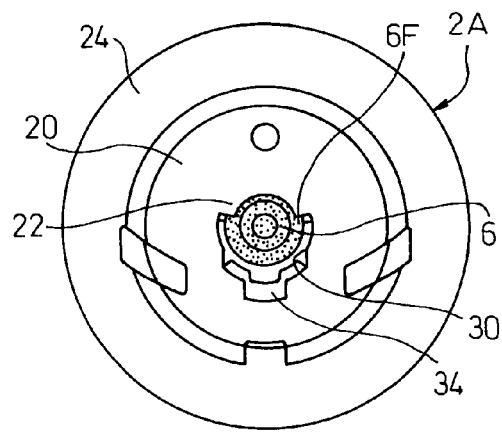
FIG. 14D is a plan view of a modified example of FIG. 14C.

The resulting condition is shown in FIGS. 14B and 14C. In FIGS. 14B and 14C, only the clamper mounting shaft 6, excluding the clamper holder 3, is shown by stippled shading. When the clamper main body 2A is fitted onto the clamper mounting shaft 6, the outside circumference of the flange portion 6F is engaged with the first and second fixed pieces 22 and 23, so that the clamper main body 2A will not become disengaged from the clamper mounting shaft 6 in the absence of external forces, but if an external force is applied in the direction of the guide hole 34 in the through hole 30, the clamper main body 2A may become disengaged from the clamper mounting shaft 6. Therefore, in the present embodiment, the engaging piece 2B is attached to the cut-out portion 7C of the chamber portion 7 to prevent the clamper main body 2A from becoming disengaged from the clamper mounting shaft 6. The first and second fixed pieces 22 and 23 may be formed as a single fixed piece 22, as in the embodiment shown in FIG. 10B. Next, a description will be given of how the engaging piece 2B is attached to the clamper main body 2A.

Figure 15A:
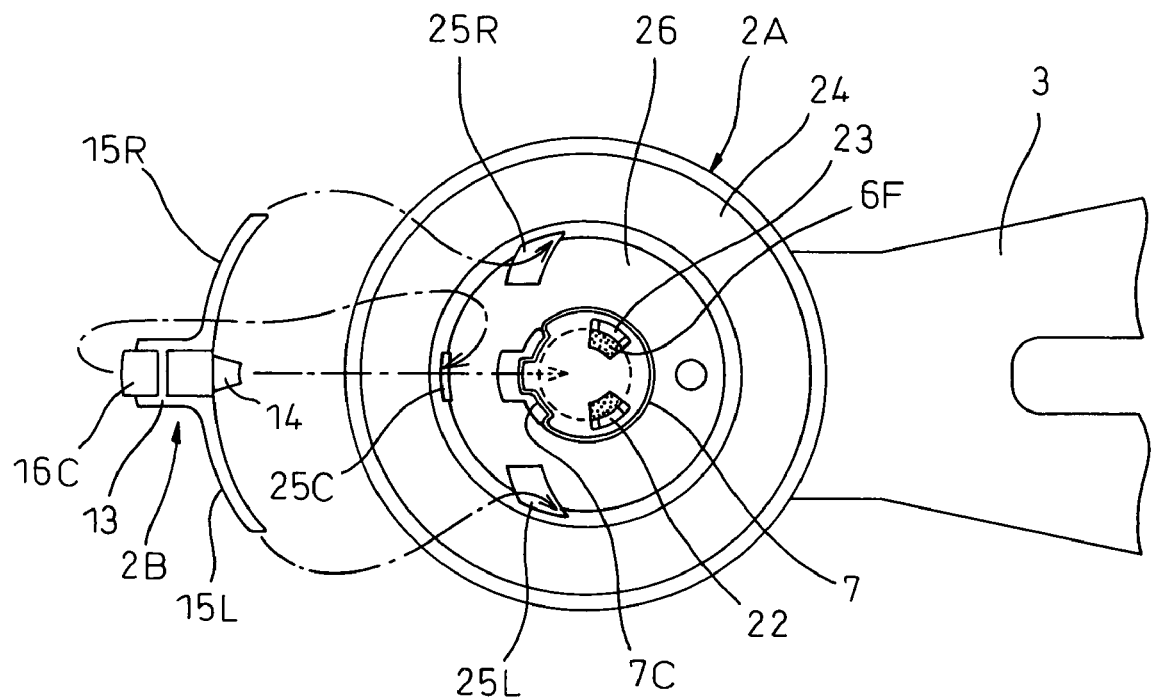
FIG. 15A is a bottom view illustrating how the engaging piece is attached to the clamper that has been fitted onto the clamper mounting shaft of the clamper holder in the manner shown in FIG. 14A.

The condition shown in FIG. 14C, in which the clamper main body 2A is fitted onto the clamper mounting shaft 6 of the clamper holder 3 in the manner shown in FIG. 14A, is shown upside down in FIG. 15A. The flange portion 6F is shown by stippled shading. In this condition, the engaging piece 2B with the head 14 formed so as to be raised from the main body 13 facing down is fitted into the clamper main body 2A. More specifically, while holding the main body 13, the engaging piece 2B is fitted by inserting the head 14 into the engaging hole 25C of the clamper main body 2A, the arm 15L into the engaging hole 25L of the clamper main body 2A, and the arm 15R into the engaging hole 25R of the clamper main body 2A. The distance between the end of the arm 15L and the end of the arm 15R is larger than the distance between the engaging hole 25L and the engaging hole 25R, but by first inserting either one of the arms 15L and 15R deep into the corresponding engaging hole and then inserting the other arm into the corresponding engaging hole, the arms 15L and 15R and the head 14 can be inserted snugly into the corresponding engaging holes 25L, 25R, and 25C.

Figure 15B:
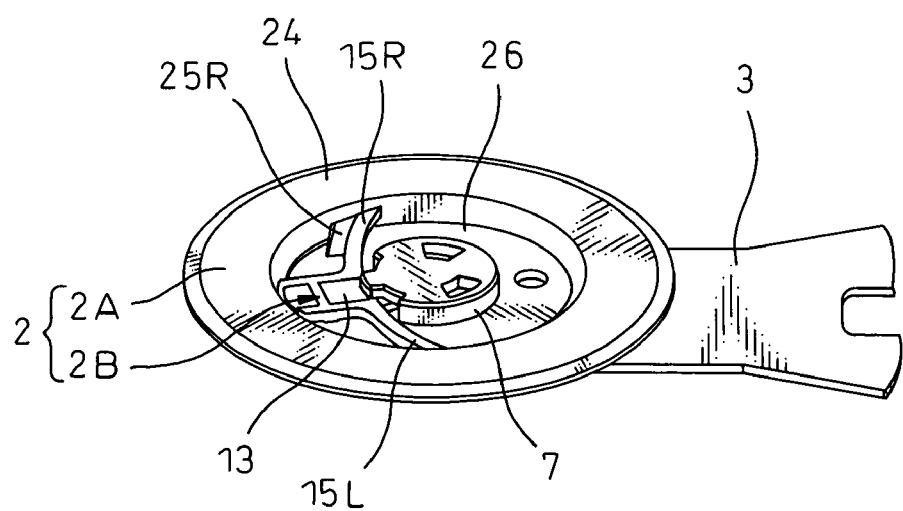
FIG. 15B is a perspective view showing a condition after the clamper and the engaging piece have been attached to the clamper holder in the manner shown in FIG. 15A.

Next, by causing the tapered face of the leg 16C to slide along the sloped face of the ring-shaped groove, the leg 16C is inserted into the engaging hole 25C of the clamper main body 2A. At this time, the arms 15L and 15R flex to facilitate the insertion of the leg 16C into the engaging hole 25C of the clamper main body 2A. In this way, the head 14 is inserted into the engaging hole 25C of the clamper main body 2A, the arm 15L is inserted into the engaging hole 25L of the clamper main body 2A, the arm 15R is inserted into the engaging hole 25R of the clamper main body 2A, and the leg 16C is inserted into the engaging hole 25C of the clamper main body 2A, resulting in the condition shown in FIG. 15B. The height from the bottom surface of the space 5 and the length protruding into the space 5 are approximately the same between the head 14 inserted into the engaging hole 25C of the clamper main body 2A and the first and second fixed pieces 22 and 23 protruding into the space 5.

In this condition, the clamper 2 with the engaging piece 2B attached to the clamper main body 2A is fitted onto the clamper mounting shaft 6 by leaving play between them. That is, the clamper 2 is allowed to move in the horizontal direction, relative to the clamper mounting shaft 6, within a range equal to the difference between the outer diameter of the clamper mounting shaft 6 and the diameter of the virtual circle K defined by the ends of the first and second fixed pieces 22 and 23 and the end of the head 14 of the engaging piece. Further, as the diameter of the virtual circle K defined by the ends of the first and second fixed pieces 22 and 23 and the end of the head 14 is smaller than the diameter of the flange portion 6F placed in the space 5, the clamper 2 is prevented from being disengaged from the clamper mounting shaft 6.

If any of the forward, backward, leftward, and rightward external forces indicated by open arrows F, B, L, and R is applied to the clamper 2 of this embodiment, the leg 16C of the engaging piece 2B resists the forward, leftward, and rightward external forces indicated by the open arrows F, L, and R, while the arms 15L and 15R resist the backward external force indicated by the open arrow B, so that the engaging piece 2B does not easily come off the clamper main body 2A. Further, as shown in the cross-sectional view of FIG. 16B, if any of the upward and downward external forces indicated by open arrows U and D applied to the clamper 2 of this embodiment, the main body 13 of the engaging piece 2B resists the upward external force indicated by the open arrow U, while the portion near the head 14 of the main body 13 and the leg 16C resist the downward external force indicated by the open arrow D, so that the engaging piece 2B does not easily come off the clamper main body 2A. As a result, the clamper 2 of this embodiment does not easily become disengaged from the mounting shaft 6.

Figure 16A:
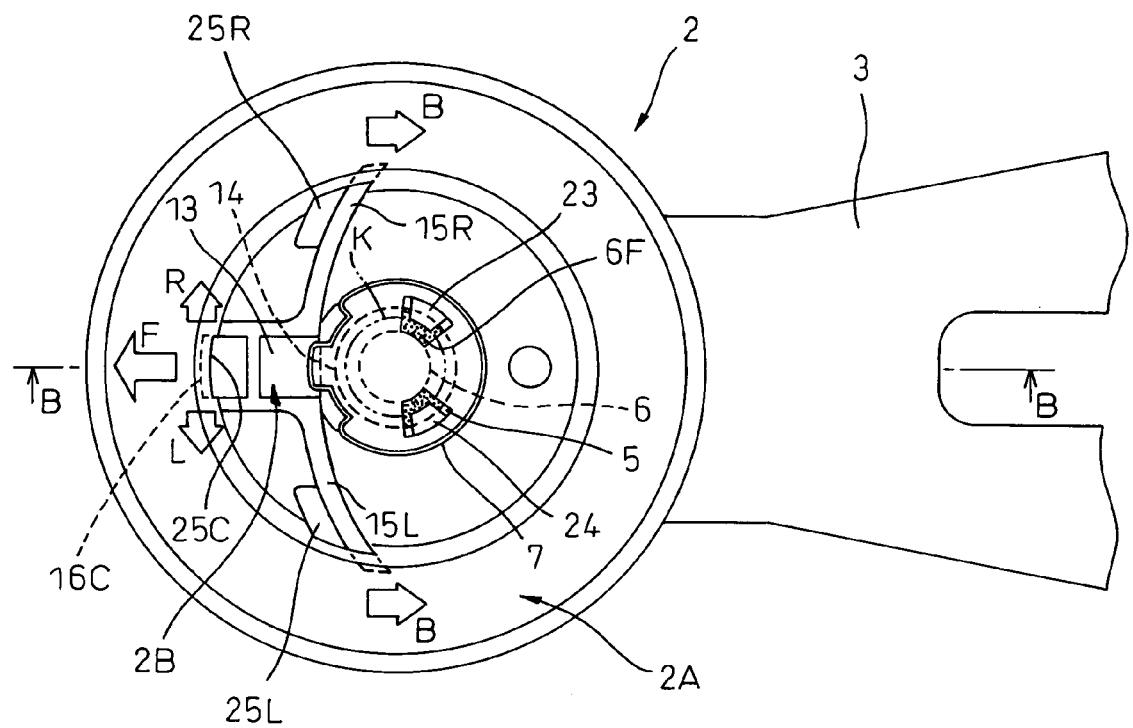
FIG. 16A is a bottom view of FIG. 15B.
Figure 16B:
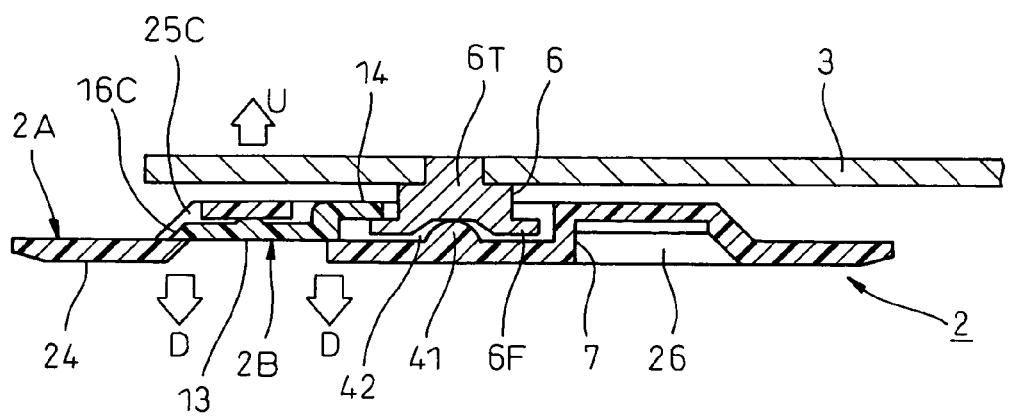
FIG. 16B is a cross-sectional view taken along line B-B in FIG. 16A.

In this embodiment also, when clamping the disk, the protrusion 41 formed in protruding fashion on the bottom surface of the chamber portion 7 shown in FIG. 16B is engaged into the recess 42 formed in the end portion of the clamper mounting shaft 6 to achieve positioning, as in the embodiment described with reference to FIGS. 11A and 11B. In this way, as in the embodiment described with reference to FIGS. 11A and 11B, the clamper 2 thus clamping the disk is allowed to rotate stably.

What is claimed is:

1. A clamp mechanism for a disk-shaped recording medium, comprising:
    a turntable for rotating said disk-shaped recording medium;
    a clamper capable of being clamped onto said turntable; and
    a clamper holder having a projecting part for holding said clamper in rotatable fashion, wherein said clamper holder is attached to said clamper by inserting at least a portion of said projecting part into a space formed within said clamper, wherein said clamper has in its center a chamber portion that faces said turntable, and said turntable has a recessed portion engageable with said chamber portion, wherein
    said projecting part is provided at an end thereof with a flange having an outer diameter to be accommodated in said space,
    said chamber portion includes a cut-out portion formed by cutting out a portion of a sidewall thereof along a length just enough to allow said flange to pass through, and
    an engaging member is provided that has a function for holding said flange in said space after said flange has been inserted into said space in said chamber portion by passing through said cut-out portion.

2. A clamp mechanism for a disk-shaped recording medium as claimed in claim 1, wherein
    said clamper includes a circular disk pressing portion, and a fitting portion that rises from said disk pressing portion;
    said chamber portion is located in a central back area of said fitting portion;
    a ring-shaped groove is between said chamber portion and said disk pressing portion;
    said space is in said chamber portion and a circular opening is in a ceiling of said chamber portion;
    said cut-out portion and said circular opening cooperate to allow said flange to insert into said space;
    at least one engaging protrusion for preventing said flange from coming out of said space is provided on said sidewall so as to protrude toward said space, and
    said cut-out portion and a portion of said ring-shaped groove that faces said sidewall of said chamber portion is provided with said engaging member that closes said cut-out portion.

3. A clamp mechanism for a disk-shaped recording medium as claimed in claim 2, wherein in said portion of said ring-shaped groove that faces said sidewall of said chamber portion,
   a first engaging hole is provided at a position facing said cut-out portion, and second and third engaging holes are provided at positions equally distanced from said first engaging hole,
   said engaging member is constructed from elastically deformable members comprising a head that serves the same function as said engaging protrusion for a main body, two arms, and one leg, and
   said head is inserted into said cut-out portion, said arms are inserted into said second and third engaging holes, and said leg is inserted into said first engaging hole.

4. A clamp mechanism for a disk-shaped recording medium as claimed in claim 3, wherein said arms are curved in the same direction as the direction along which said portion of said ring-shaped groove, that faces said sidewall of said chamber portion, is curved.

* * * * *